(12) United States Patent
Yarka

(10) Patent No.: US 11,554,532 B2
(45) Date of Patent: Jan. 17, 2023

(54) EXTRUDER THERMAL MANAGEMENT

(71) Applicant: MakerBot Industries, LLC, Brooklyn, NY (US)

(72) Inventor: Christopher James Yarka, Brooklyn, NY (US)

(73) Assignee: MakerBot Industries, LLC, Brooklyn, NY (US)

(*) Notice: Subject to any disclaimer, the term of this patent is extended or adjusted under 35 U.S.C. 154(b) by 362 days.

(21) Appl. No.: 16/570,145

(22) Filed: Sep. 13, 2019

(65) Prior Publication Data

US 2020/0086552 A1 Mar. 19, 2020

Related U.S. Application Data

(60) Provisional application No. 62/731,551, filed on Sep. 14, 2018, provisional application No. 62/777,587, filed on Dec. 10, 2018.

(51) Int. Cl.
| | |
|---|---|
| B29C 64/118 | (2017.01) |
| B33Y 30/00 | (2015.01) |
| B33Y 40/00 | (2020.01) |
| B29C 64/379 | (2017.01) |
| B29C 64/245 | (2017.01) |
| B29C 64/232 | (2017.01) |
| B29C 64/209 | (2017.01) |
| B29C 64/321 | (2017.01) |
| B29C 64/236 | (2017.01) |

(Continued)

(52) U.S. Cl.
CPC ......... *B29C 64/118* (2017.08); *B29C 64/209* (2017.08); *B29C 64/232* (2017.08); *B29C 64/236* (2017.08); *B29C 64/245* (2017.08); *B29C 64/295* (2017.08); *B29C 64/321* (2017.08); *B29C 64/35* (2017.08); *B29C 64/379* (2017.08); *B29C 64/393* (2017.08); *B33Y 30/00* (2014.12); *B33Y 40/00* (2014.12); *B33Y 50/02* (2014.12); *B29C 64/182* (2017.08); *B33Y 10/00* (2014.12)

(58) Field of Classification Search
CPC ................ B29C 64/118; B29C 64/209; B29C 64/364–371
See application file for complete search history.

(56) References Cited

U.S. PATENT DOCUMENTS

| | | | |
|---|---|---|---|
| 5,764,521 | A | 6/1998 | Batchelder et al. |
| 6,162,378 | A | 12/2000 | Bedal et al. |

(Continued)

FOREIGN PATENT DOCUMENTS

| | | |
|---|---|---|
| CN | 104589649 | 5/2015 |
| CN | 105291436 | 2/2016 |

(Continued)

OTHER PUBLICATIONS

Hannfin, Parker, "Coefficient of Thermal Expansion", https://promo.parker.com/promotionsite/oring-ehandbook/US/en/ehome/Coefficient-of-Thermal-Expansion Sep. 7, 2015, 2 pages.

(Continued)

*Primary Examiner* — Matthew J Daniels
*Assistant Examiner* — Andrew L Swanson
(74) *Attorney, Agent, or Firm* — Strategic Patents, P.C.

(57) ABSTRACT

A variety of techniques are used to manage temperature in and around an extruder for a three-dimensional printer.

12 Claims, 4 Drawing Sheets

(51) Int. Cl.
B29C 64/35 (2017.01)
B29C 64/295 (2017.01)
B29C 64/393 (2017.01)
B33Y 50/02 (2015.01)
B33Y 10/00 (2015.01)
B29C 64/182 (2017.01)

(56) References Cited

U.S. PATENT DOCUMENTS

| | | | |
|---|---|---|---|
| 7,625,200 | B2 | 12/2009 | Leavitt |
| 8,663,533 | B2 | 3/2014 | Swanson et al. |
| 9,168,685 | B2 | 10/2015 | Swanson et al. |
| 9,233,506 | B2 | 1/2016 | Leavitt |
| 9,744,730 | B2 | 8/2017 | Comb |
| 10,124,539 | B2 | 11/2018 | Batchelder et al. |
| 2007/0228590 | A1 | 10/2007 | LaBossiere et al. |
| 2010/0166969 | A1 | 7/2010 | Batchelder |
| 2012/0164256 | A1* | 6/2012 | Swanson ............... B29C 64/209 425/162 |
| 2014/0159284 | A1 | 6/2014 | Leavitt |
| 2014/0363532 | A1 | 12/2014 | Wolfgram |
| 2016/0193778 | A1* | 7/2016 | Lee ....................... B29C 64/364 425/378.1 |
| 2016/0194233 | A1* | 7/2016 | Van Pelt ................ C03B 19/00 65/32.4 |
| 2016/0236408 | A1* | 8/2016 | Wolf ..................... B29C 64/209 |
| 2016/0263830 | A1 | 9/2016 | Batchelder et al. |
| 2016/0263833 | A1* | 9/2016 | Vittitow ................. B22F 10/30 |
| 2017/0057168 | A1* | 3/2017 | Miller ................... B33Y 30/00 |
| 2018/0178462 | A1 | 6/2018 | Blythe et al. |
| 2018/0326658 | A1* | 11/2018 | Saito ..................... B29C 64/245 |
| 2019/0084226 | A1* | 3/2019 | Ohno .................... B29C 64/209 |
| 2019/0283050 | A1* | 9/2019 | Schneider ............. B29C 64/209 |
| 2019/0322047 | A1 | 10/2019 | Riha et al. |
| 2020/0079014 | A1 | 3/2020 | Migliori et al. |
| 2020/0086566 | A1 | 3/2020 | Goodman et al. |
| 2020/0086569 | A1 | 3/2020 | MacNeil et al. |
| 2020/0086577 | A1 | 3/2020 | Pappas et al. |
| 2020/0130277 | A1 | 4/2020 | Thorpe et al. |

FOREIGN PATENT DOCUMENTS

| | | |
|---|---|---|
| CN | 106696256 A * | 5/2017 |
| WO | WO-2020056300 | 3/2020 |

OTHER PUBLICATIONS

Wright, John E., "Tip Shields", uPrint SE & uPrint SE Plus, https://www.youtube.com/watch?v=y4aXvAWDXkQ Apr. 9, 2014, 1 page.
"Engineering Tool Box, Coefficients of Linear Thermal Expansion", [online] Available at: https://www.engineeringtoolbox.com/linear-expansion-coefficients-d_95.html 2003, 10 pages.
"Engineering ToolBox,Thermal Conductivity of some selected Materials and Gases", [online] Available at: https://www.engineeringtoolbox.com/thermal-conductivity-d_429.html 2003, 13 pages.
"Thermo Fisher Scientific, Material Safety Data Sheet Poly(tetrafluoroethylene)", Jan. 19, 2018, 6 pages.
"RGP Balls, Viton Rubber Balls", https://www.rgpballs.com/en/viton-rubber-balls/ Feb. 7, 2013, 2 pages.
"U.S. Appl. No. 16/570,435 Non-Final Office Action dated Feb. 23, 2021", 35 pages.
WIPO, "Application No. PCT/US19/51066 International Preliminary Report on Patentability dated Mar. 26, 2021", 15 pages.
ISA, "International Application Serial No. PCT/US19/51066, International Search Report and Written Opinion dated Feb. 3, 2020", 22 pages.
ISA, "International Application Serial No. PCT/US19/51066, Invitation to Pay Fees and Partial Search Report dated Dec. 12, 2019", 16 pages.
Stratasys, "Tip Shield", Stratasys Technical Disclosure 09-001 ,1 page.

* cited by examiner

EXTRUDER THERMAL MANAGEMENT

CROSS-REFERENCE TO RELATED APPLICATIONS

This application claims priority to U.S. Provisional Application No. 62/731,551 filed on Sep. 14, 2018 and U.S. Provisional Application No. 62/777,587 filed on Dec. 10, 2018, where the entire contents of each of the foregoing applications are hereby incorporated by reference.

FIELD

The present disclosure relates generally to three-dimensional printing, and more specifically to thermal management of an extruder for a three-dimensional printer.

BACKGROUND

An extruder for a three-dimensional printer may define a chamber in thermal communication with a heater that heats a build material to a target temperature above a liquefaction temperature of the build material, and the melted build material may move through a nozzle of the extruder to form an object during a three-dimensional print. As the heater heats the build material to the target temperature, the heater may undesirably heat other portions of the extruder where such heat can cause damage. For example, excess heat experienced near an inlet and/or an outlet of the extruder can damage components located on or adjacent to these orifices. There remains a need for improved thermal management of an extruder for a three-dimensional printer.

SUMMARY

A variety of techniques are used to manage temperature in and around an extruder for a three-dimensional printer.

In one aspect, an extruder disclosed herein for a three-dimensional printer includes a nozzle assembly defining a first orifice, a second orifice, and a chamber fluidically coupling the first orifice to the second orifice. The extruder also includes a heating element positioned to heat the chamber, a first fluid source directed toward the first orifice to form a thermal break mitigating an upward heat flow from the chamber toward the first orifice, and a manifold structurally configured to direct a flow of fluid about the second orifice, the manifold defining a plurality of exit holes for the flow of fluid, the plurality of exit holes positioned and oriented to direct the flow of fluid in an omnidirectional fluid flow away from a perimeter of the second orifice to cool a region around the perimeter of the second orifice.

Implementations may include one or more of the following features. The flow of fluid may be provided by the first fluid source. The flow of fluid may be provided by a second fluid source independent from the first fluid source. Exit holes of the plurality of exit holes may be spaced equidistant from one another about a perimeter of the nozzle assembly. The heating element may be configured to heat the chamber to maintain a build material in the chamber at a target temperature above a liquefaction temperature of the build material, where the first fluid source moves fluid toward the first orifice at a first temperature below the target temperature of the build material in the chamber, and where the flow of fluid about the second orifice is provided at a second temperature below the target temperature of the build material.

In one aspect, an extruder disclosed herein for a three-dimensional printer includes a nozzle assembly defining a first orifice, a second orifice, and a chamber extending from the first orifice to the second orifice, the chamber defining a longitudinal axis extending through the first orifice and the second orifice. The extruder also includes a conduit coupled to the nozzle assembly, the conduit defining a third orifice directed toward the first orifice to form a thermal break mitigating heat flow from the chamber toward the first orifice. The extruder also includes a manifold coupled to the nozzle assembly, the manifold defining a plurality of exit holes, each exit hole of the plurality of exit holes disposed at a position along the longitudinal axis between the first orifice and the second orifice, and each exit hole of the plurality of exit holes oriented to direct a fluid in a direction away from the second orifice to cool a region around a perimeter of the second orifice.

Implementations may include one or more of the following features. The manifold may be fluidically isolated from the chamber defined by the nozzle assembly. The manifold may be in fluid communication with the conduit such that a fluid is deliverable through the plurality of exit holes of the manifold and the third orifice of the conduit via a single fluid source. The manifold may include an annulus coaxial with the longitudinal axis defined by the chamber to produce an omnidirectional fluid flow about the perimeter of the second orifice. The exit holes corresponding to the plurality of exit holes may be spaced equidistant from one another about a perimeter of a surface of the nozzle assembly. The longitudinal axis defined by the chamber of the nozzle assembly may intersect a transverse axis defined by the conduit at the first orifice. In a direction along the longitudinal axis, a surface of the nozzle assembly may be tapered between the position of the plurality of exit holes and the second orifice. The extruder may further include a heating element coupled to the nozzle assembly, the heating element in thermal communication with the chamber via thermal conduction through the nozzle assembly. A first thermal conductivity between the heating element and the chamber may be less than a second thermal conductivity between the heating element and the plurality of exit holes defined by the manifold.

In one aspect, a method disclosed herein includes heating a chamber defined by a nozzle assembly of the extruder, the chamber extending from a first orifice to a second orifice; moving a first fluid across the first orifice; and moving a second fluid to produce an omnidirectional fluid flow away from the second orifice to cool a region around a perimeter of the second orifice.

Implementations may include one or more of the following features. Heating the chamber may include maintaining a build material in the chamber at a target temperature above a liquefaction temperature of the build material, where the first fluid moves across the first orifice at a first temperature below the target temperature of the build material in the chamber, and where the second fluid moves about the perimeter of the second orifice at a second temperature below the target temperature of the build material. Moving the first fluid across the first orifice may include adjusting a volumetric flow rate of the first fluid across the first orifice based on a temperature of the nozzle assembly. Moving the second fluid may include adjusting a volumetric flow rate of the second fluid based on movement of the extruder. Moving the second fluid may include directing multiple streams of the second fluid about the perimeter of the second orifice. Movement of the first fluid across the first orifice may be independently controllable relative to movement of the second fluid about the perimeter of the second orifice.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DESCRIPTION

Figure 1:
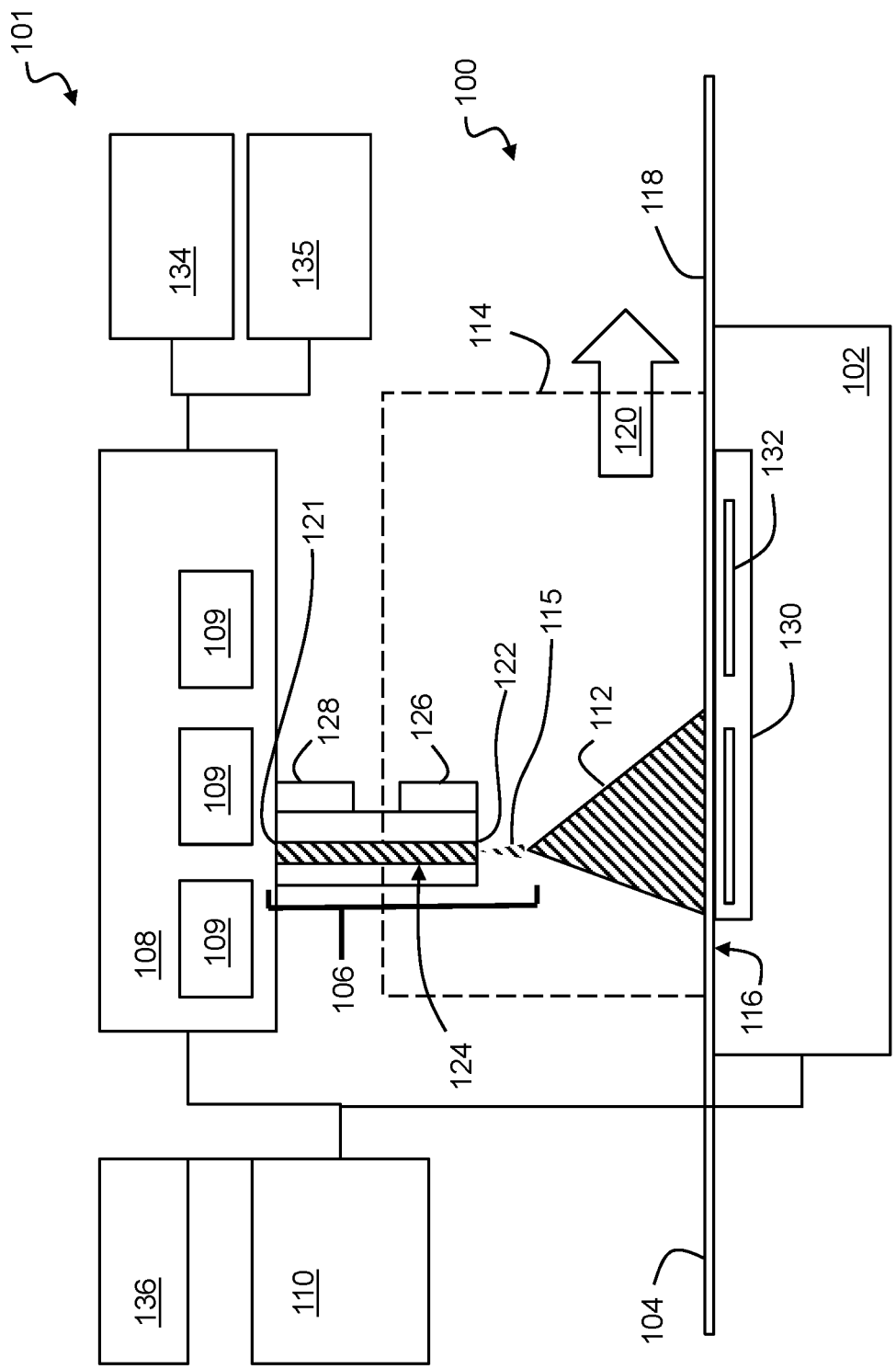
FIG. 1 is a block diagram of a three-dimensional printer.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better describe the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Described herein are devices, systems, and methods for improvements in three-dimensional printing, such as improvements related to thermal management for an extruder of a three-dimensional printer.

The following description emphasizes three-dimensional printers using fused deposition modeling or similar techniques where a bead of material is extruded in a layered series of two dimensional patterns as "roads" or "paths" to form a three-dimensional object from a digital model. It will be understood, however, that numerous additive fabrication techniques are known in the art including, without limitation, multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer," "three-dimensional printer," "fabrication system," and so forth, unless a more specific meaning is explicitly provided or otherwise clear from the context.

FIG. 1 is a block diagram of a three-dimensional printer. In general, a printer 100 may include a build platform 102 (which may otherwise be referred to herein as a "build plate"), a conveyor 104, an extruder 106, an x-y-z positioning assembly 108, and a controller 110 that cooperate with one another, within a working volume 114 of the printer 100, to fabricate an object 112 from a build material 115.

The build platform 102 may include a surface 116 that is rigid and substantially planar. The surface 116 may support the conveyer 104 to provide a fixed, dimensionally and positionally stable platform on which to build the object 112.

The build platform 102 may include a thermal element 130 that controls the temperature of the build platform 102 through one or more active devices 132 such as thermoelectric heating and/or cooling devices (e.g., resistive elements that convert electrical current into heat, Peltier effect devices that can create a heating or cooling affect, and combinations thereof). Accordingly, the thermal element 130 may be a heater that provides active heating to the build platform 102, a cooling element that provides active cooling to the build platform 102, or a combination of these. The heater 130 may be coupled in a communicating relationship with the controller 110 such that the controller 110 may control heat imparted to or removed from the surface 116 of the build platform 102 by the heater 130. Thus, for example, the thermal element 130 may include an active cooling element positioned within or adjacent to the build platform 102 to controllably cool the build platform 102.

It will be understood that a variety of other techniques may additionally, or alternatively, be employed to control a temperature of the build platform 102. For example, the build platform 102 may use a gas cooling or gas heating device such as a vacuum chamber in an interior thereof, which may be quickly pressurized to heat the build platform 102 or vacated to cool the build platform 102 as desired. As another non-exclusive example, a stream of heated or cooled gas may be applied directly to the build platform 102 before, during, and/or after a build process.

The conveyer 104 may include a sheet 118 that moves in a path 120 through the working volume 114. Within the working volume 114, the path 120 may pass along the surface 116 of the build platform 102—that is, resting directly on or otherwise supported by the surface 116—such that the build platform 102 may provide a rigid, positionally stable working surface for a build. It will be understood that, while the path 120 is depicted as a unidirectional arrow, the path 120 may be multidirectional. For example, the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118. Thus, while the path 120 may be generally (but not necessarily) uniform through the working volume 114, the conveyer 104 may move in any direction suitable for moving completed items from the working volume 114. The conveyor 104 may, additionally or alternatively, include a motor or other similar drive mechanism (not shown) coupled to the controller 110 to control movement of the sheet 118 along the path 120. Various drive mechanisms are described in further detail below.

In general, the sheet 118 may be formed of a flexible material such as a mesh material, a polyamide, a polyethylene terephthalate (commercially available in bi-axial form as MYLAR®, available from DuPont Teijin Films USA of Chester, Va.), a polyimide film (commercially available as KAPTON® available from DuPont of Wilmington, Del.), or any other suitably strong polymer or other material. The sheet 118 may have a thickness of greater than about three thousandths of an inch (about 0.0762 mm) and less than about seven thousandths of an inch (about 0.1778 mm), or any other thickness that permits the sheet 118 to follow the path 120 of the conveyer 104. For example, with sufficiently strong material, the sheet 118 may have a thickness of greater than about one thousandth of an inch and less than about three thousandths of an inch. The sheet 118 may further, or instead, include sections of rigid material joined by flexible links.

A working surface of the sheet 118 (e.g., an area on the top surface of the sheet 118 within the working volume 114) may be treated to assist with adhesion of the build material 115 to the sheet 118 and/or to facilitate removal of completed objects from the sheet 118. For example, the working surface may be abraded or otherwise textured (e.g., with grooves, protrusions, and the like) to improve adhesion between the working surface and the build material 115.

A variety of chemical treatments may be used on the working surface of the sheet 118 as part of build processes described herein. For example, the chemical treatment may include deposition of material that can be chemically removed from the conveyer 104 by use of water, solvents, or the like. This may facilitate separation of a completed instance of the object 112 from the conveyer by dissolving the layer of chemical treatment between the completed instance of the object 112 and the conveyor 104. The chemical treatments may include deposition of a material that easily separates from the conveyer 104 such as a wax, mild adhesive, or the like. The chemical treatment may include a detachable surface such as an adhesive that is sprayed onto the conveyer 104 prior to fabrication of the object 112.

In one aspect, the conveyer 104 may include a sheet of disposable, one-use material fed from a dispenser and consumed with each successive build.

In one aspect, the conveyer 104 may include a number of different working areas with different surface treatments adapted for different compositions of the build material 115 or processes. For example, different areas may have different textures (e.g., smooth, abraded, grooved, etc.). Additionally, or alternatively, different areas may be formed of different materials. Further, or instead, different areas may have or receive different chemical treatments. Thus, it should be appreciated that a single instance of the conveyer 104 may be used in a variety of different build processes by selecting the various working areas as needed or desired.

The extruder 106 may define a first orifice 121, a second orifice 122, and a chamber 124 coupling the first orifice 121 to the second orifice 122. The build material 115 may, for example, include one or more of acrylonitrile butadiene styrene ("ABS"), high-density polyethylene ("HDPL"), polylactic acid, or any other suitable plastic, thermoplastic, or other material that can usefully be extruded to form a three-dimensional object.

The extruder 106 may include a heater 126 to melt the build material 115 (e.g., thermoplastic material) within the chamber 124 for extrusion through the second orifice 122 in melted form. While represented in block form in FIG. 1 for the sake of clarity, it will be understood that the heater 126 may include, for example, coils of resistive wire wrapped about the chamber 124, one or more heating blocks with resistive elements to heat the chamber 124 with applied current, an inductive heater, or any other arrangement of heaters suitable for creating heat within the chamber 124 to melt the build material 115 for extrusion. The extruder 106 may also, or instead, include a motor 128 to push the build material 115 through the chamber 124, in a direction from the first orifice 121 toward the second orifice 122.

In general operation (and by way of example rather than limitation), the build material 115 may initially be in a form, such as ABS plastic in filament form, that may be fed into the chamber 124, via the first orifice 121, by the motor 128, melted in the chamber 124 by the heater 126, and extruded from the chamber 124 via the second orifice 122. By controlling process parameters (e.g., one or more of a rate of the motor 128 or the temperature of the heater 126) the build material 115 may be extruded from the second orifice 122 at a controlled volumetric rate. It will be understood that a variety of techniques may be employed to deliver the build material 115 at a controlled volumetric rate, which may depend upon the composition of the material 115, the volumetric rate desired, and any other factors. All such techniques that might be suitably adapted to delivery of the build material 115 for fabrication of three-dimensional object 112 are intended to fall within the scope of this disclosure. Other techniques may be employed for three-dimensional printing, including extrusion-based techniques using compositions of the build material 115 that are curable and/or compositions of the build material 115 of sufficient viscosity to retain shape after extrusion.

The x-y-z positioning assembly 108 may generally be movable to position the second orifice 122 of the extruder 106 three-dimensionally within the working volume 114. Thus, for example, by controlling the volumetric rate of delivery for the build material 115 and the x, y, z position of the second orifice 122, the object 112 may be fabricated in three dimensions by depositing successive layers of the build material 115 in two-dimensional patterns (e.g., two-dimensional patterns derived from cross-sections of a computer model or other computerized representation of the object 112). The x-y-z positioning assembly 108 may, for example, include a number of stepper motors 109 (e.g., independently operable) to control a position of the extruder 106 and, thus, the second orifice 122 within the working volume 114 along each of an x-axis, a y-axis, and a z-axis. More generally, the x-y-z positioning assembly 108 may include, without limitation, various combinations of stepper motors, encoded DC motors, gears, belts, pulleys, worm gears, threads, and the like. Any such arrangement suitable for controllably positioning the second orifice 122 of the extruder 106 within the working volume 114 may be adapted to use with the printer 100 described herein.

By way of example and not limitation, the conveyor 104 may be x-y positionable within a plane defined by the sheet 118 of the conveyor 104, while the extruder 106 may be independently moved relative to the conveyor 104 along a z-axis. Additionally, or alternatively, the conveyor 104 may be x, y, and z positionable, and the extruder 106 may be stationary. Further, or instead, the extruder 106 may be x, y, and z positionable while the conveyer 104 remains fixed relative to the working volume 114. In yet another example, the conveyer 104 may, by movement of the sheet 118, control movement in one axis (e.g., the y-axis), while the extruder 106 moves in the z-axis as well as one axis in the plane defined by the sheet 118. Thus, in certain instances, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, the x-y-z positioning assembly 108 may include any arrangement of motors and other hardware controllable by the controller 110 to position the extruder 106 described herein. Still more generally, while an x, y, z coordinate system may be convenient for positioning within three dimensions, any other coordinate system or combination of coordinate systems may also or instead be employed, such as a positional controller and assembly that operates according to one or more of cylindrical coordinates or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material 115. The controller 110 may include any combination of software and/or processing circuitry suitable for controlling the various components of the printer 100 described herein including, without limitation, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through a network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134. The sensor 134 may include a temperature sensor positioned to sense a temperature of the surface of the build platform 102. This may, for example, include a thermistor embedded within or attached below the surface of the build platform 102. This may also or instead include an infrared detector directed at the surface 116 of the build platform 102 or the sheet 118 of the conveyer 104. Other sensors that may be usefully incorporated into the printer 100 as the sensor 134 include, without limitation, a heat sensor, a volume flow rate sensor, a weight sensor, a sound sensor, and a light sensor. Certain more specific examples are provided below by way of example and not of limitation.

The sensor 134 may detect a presence (or absence) of the object 112 at a predetermined location on the conveyor 104. This may include an optical detector in a beam-breaking configuration to sense the presence of the object 112 at a location such as an end of the conveyor 104. This may also or instead include an imaging device and image processing circuitry to capture an image of the working volume 114 and analyze the image to evaluate a position of the object 112. This sensor 134 may be used, for example, to ensure that the object 112 is removed from the conveyor 104 prior to beginning a new build at that location on the working surface (e.g., the surface 116 of the build platform 102). Thus, the sensor 134 may be used to determine whether an object is present that should not be, or to detect when an object is absent, or a combination thereof. The feedback from this sensor 134 may be used by the controller 110 to issue processing interrupts or otherwise control operation of the printer 100.

The sensor 134 may detect a position of the conveyer 104 along the path. This information may be obtained, for example, from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may also or instead include at least one video camera. The video camera may generally capture images of the working volume 114, the object 112, or any other hardware associated with the printer 100. The video camera may provide a remote video feed through the network interface 136. In such instances, the feed may be available to remote users through a user interface maintained, for example, by remote hardware, or, further or instead, the feed may be available within a web page provided by a web server hosted by the three-dimensional printer 100. Thus, in certain implementations, there is a user interface adapted to present a video feed from at least one video camera of a three-dimensional printer to a remote user through a user interface.

The sensor 134 may also or instead include a three-dimensional scanner using optical techniques (e.g., stereoscopic imaging, or shape from motion imaging), structured light techniques, or any other suitable sensing and processing hardware that might extract three-dimensional information from the working volume 114. In some instances, the sensor 134 may include a machine vision system that captures images and analyzes image content to obtain information about the status of a job, the working volume 114, or the object 112 therein. The machine vision system may support a variety of imaging-based automatic inspection, process control, and/or robotic guidance functions for the three-dimensional printer 100 including, without limitation, pass/fail decisions, error detection (and corresponding audible or visual alerts), shape detection, position detection, orientation detection, collision avoidance, and combinations thereof.

The printer 100 may include other hardware 135, which may be, for example, input devices including any one or more of the following: a keyboard, a touchpad, a mouse, switches, dials, buttons, and motion sensors. Additionally, or alternatively, the other hardware 135 may be, for example, output devices including any one or more of the following: a display, a speaker or other audio transducer, and light emitting diodes. Other hardware 135 may also or instead include a variety of cable connections and/or hardware adapters for connecting, for example, to external computers, external hardware, external instrumentation data acquisition systems, and combinations thereof.

The printer 100 may include, or be connected in a communicating relationship with, the network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long-range wireless networking components. This may include hardware for short range data communications such as Bluetooth or an infrared transceiver, which may be used to couple into a local area network that is, in turn, coupled to a data network such as the Internet. This may also, or instead, include hardware/software for a WiMAX connection or a cellular network connection (using, e.g., CDMA, GSM, LTE, or any other suitable protocol or combination of protocols). The controller 110 may be configured to control participation by the printer 100 in any network to which the network interface 136 is connected, such as by autonomously connecting to the network to retrieve printable content, or responding to a remote request for status or availability.

Specific aspects of three-dimensional printing using the three-dimensional printer 100 of FIG. 1, will now be discussed. More specifically, a variety of techniques that can be used to manage the temperature in and around an extruder for a three-dimensional printer will now be discussed. For example, a thermal management technique for an extruder may include one or more of (i) establishing a thermal break along an inlet portion of an extruder, or (ii) actively cooling an outlet portion of the extruder. As used herein, the term "thermal break" shall be understood to include a forced convection flow of fluid across an area of an extruder to interrupt a flow of thermal energy that would otherwise occur, in the absence of the thermal break, between the extruder and one or more components of the printer in the vicinity of the extruder. Thus, for example, the thermal break may interrupt natural convection between a portion of the extruder and a region in the vicinity of the extruder. Further, or instead, as used herein, the term "active cooling" shall be understood to refer more generally to force convection of an area.

Figure 2:
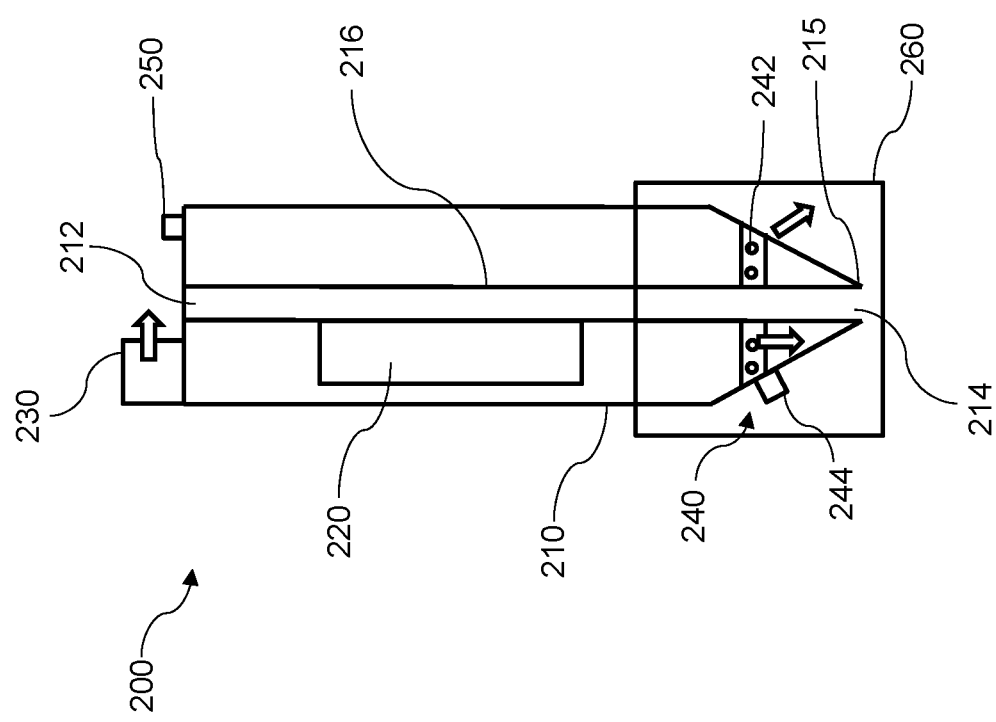
FIG. 2 is a schematic representation of an extruder for a three-dimensional printer.

FIG. 2 is a schematic representation of an extruder for a three-dimensional printer. Thus, unless otherwise specified or made clear from the context, the extruder 200 should be understood to be interchangeable with the extruder 106 discussed above with respect to FIG. 1. That is, the extruder 200 may be the same as or similar to the extruder 106 described above with reference to FIG. 1, but with additional features and components for improved thermal management. In this manner, it will be understood that the extruder 200 may be part of a three-dimensional printer or a three-dimensional printing system.

The extruder 200 may include a nozzle assembly 210 defining a first orifice 212, a second orifice 214, and a chamber 216 fluidically coupling the first orifice 212 to the second orifice 214. The first orifice 212 may be an inlet for the nozzle assembly 210 and the second orifice 214 may be an outlet for the nozzle assembly 210. In this manner, during a three-dimensional printing operation, the first orifice 212 may receive a build material (e.g., in filament form) from a source of build material (e.g., a filament spool), and the build material may be moved, via the first orifice 212, into the chamber 216 to be heated, melted, or otherwise substantially liquified for eventual extrusion out of the second orifice 214 (e.g., onto a build platform or the like) for forming at least a portion of a three-dimensional object.

The extruder 200 may include a heating element 220 positioned to heat the chamber 216 and thus the build material within the chamber 216. For example, the heating element 220 may be disposed adjacent to the chamber 216. The heating element 220 may heat the chamber 216 to maintain a build material in the chamber 216 at a target temperature, above a liquefaction temperature of the build material. Heat from the heating element 220 may be transferred toward one or more of the first orifice 212 or the second orifice 214 of the nozzle assembly 210, where such heating may be undesirable. That is, excess heating of the first orifice 212 may damage components (e.g., wiring, electronics, an x-y-z positioning assembly, a motor, build material to be fed into the first orifice 212, and so on) adjacent to the first orifice 212. Similarly, excess heating of the second orifice 214 can cause deposited build material within a certain vicinity of the second orifice 214 to begin to melt, thereby damaging a printed part. Accordingly, the extruder 200 may mitigate undesirable heating of the areas or regions disposed at or near one or more of the first orifice 212 and the second orifice 214 of the nozzle assembly 210. For example, as described in greater detail below, the extruder 200 may include one or more of (i) a first fluid source 230 directed toward the first orifice 212 to form a thermal break along the first orifice 212 to reduce the likelihood of inadvertent heat flow beyond the first orifice 212 in a direction away from the nozzle assembly 210, and (ii) a manifold 240 structurally configured to direct a flow of fluid about the second orifice 214 to cool a region around the perimeter 215 of the second orifice 214.

The first fluid source 230 may include one or more of a fan, a blower, and so on. For example, the first fluid source 230 may include a variable fan with a speed controllable in response to a signal from one or more sensors 250. As an example, the one or more sensors 250 may include a temperature sensor, and a speed of the variable fan may be controlled based at least in part on feedback from the temperature sensor. That is, at higher temperatures, the speed of the fan may be increased to increase convective cooling along the first orifice 212.

As discussed above, the heating element 220 may be configured to heat the chamber 216 to maintain a build material in the chamber 216 at a target temperature above a liquefaction temperature of the build material. Thus, the first fluid source 230 may move fluid toward the first orifice 212 at a first temperature below the target temperature of the build material in the chamber 216. For example, the first temperature may be greater than about 25 degrees Celsius and less than about 200 degrees Celsius.

The manifold 240 may define a plurality of exit holes 242 to facilitate directing a flow of fluid from the manifold 240 to a region about the second orifice 214. Specifically, one or more instances of the exit hole 242 of the plurality of exit holes 242 (e.g., each instance of the exit hole 242 of the plurality of exit holes 242) may be positioned and oriented to produce a flow of a fluid (e.g., air) to cool a region around the perimeter 215 of the second orifice 214. That is, in certain implementations, one or more instances of the exit hole 242 of the plurality of exit holes 242 may be generally shaped to direct the fluid to cool a region around the second orifice 214 of the nozzle assembly 210 while reducing the likelihood of cooling a build material moving through the second orifice 214 of the nozzle assembly 210 itself. For example, in certain implementations, the plurality of exit holes 242 may be spaced from one another about a perimeter of the nozzle assembly 210 (e.g., equidistantly spaced from one another) such that the fluid issues from the plurality of exit holes 242 in an omnidirectional flow pattern. As used in this context, an omnidirectional flow pattern shall be understood to include any flow pattern produced by the plurality of exit holes 242 about a perimeter 215 of the nozzle assembly 210 and having a radial flow component and an axial flow component. Thus, for example, an omnidirectional flow pattern may be a flow pattern that, at some distance away from the nozzle assembly 210, extends substantially 360-degrees radially about an axis defined by the chamber 216. As a more specific example, the omnidirectional flow pattern may cool recently deposited build material around a region of newly deposited build material during the course of a build.

In general, the fluid delivered from the plurality of exit holes 242 may include any appropriate coolant suitable for achieving appropriate temperature control in the vicinity of the second orifice 214. The fluid flow may include movement of a substance in a gaseous state, such as ambient air from within a build volume of a three-dimensional printer including the extruder 200. The ambient air may also or instead be drawn from a source external to the build volume of a three-dimensional printer including the extruder 200. Also, or instead, the fluid may be provided from a fluid source, such as, a tank of air or the like. Thus, in certain implementations, the fluid includes air having a chemical composition similar to atmospheric air at sea level. The fluid may also or instead include another gaseous substance, such as hydrogen, sulfur hexafluoride, an inert gas such as helium, and the like. The fluid may also or instead include a liquid, such as water (e.g., deionized water).

The source of the fluid for the flow of fluid about the second orifice 214 may be the same as the source of the fluid for the flow of fluid about the first orifice 212. Thus, the flow of fluid about the second orifice 214 may be provided by the first fluid source 230. In this manner, in certain implementations, the fluid used for the flow of fluid about the second orifice 214 may be the same as the fluid used for the flow of fluid about the first orifice 212. For example, the first fluid source 230 (e.g., a fan, a blower, or the like) may be ducted or otherwise have a flow of fluid therefrom distributed toward different ends of the nozzle assembly 210, e.g., in the vicinity of the first orifice 212 and the second orifice 214. Individual control of fluid directed toward different ends of the nozzle assembly 210 in such an embodiment may be possible through the inclusion of one or more valves, louvers, diffusers, vents, combinations thereof and the like.

In certain implementations, the extruder 200 may include a second fluid source 244 independent from the first fluid source 230. Thus, in certain implementations, the fluid used for the flow of fluid about the second orifice 214 may be different from the fluid used for the flow of fluid about the first orifice 212. The same type of fluid may also or instead be used, even where the first fluid source 230 and the second fluid source 244 are separate and distinct.

The second fluid source 244 may include one or more of a fan (e.g., a variable speed fan), a blower, and so on. As discussed above, the heating element 220 may be configured to heat the chamber 216 to maintain a build material in the chamber 216 at a target temperature above a liquefaction temperature of the build material. The second fluid source 244 may move fluid at a second temperature below the target temperature of the build material in the chamber 216. For example, the second temperature may be greater than about 25 degrees Celsius and less than about 200 degrees Celsius below the target temperature, where other temperatures are also or instead possible for the second temperature.

The manifold 240 may be coupled to the second fluid source 244 such that the plurality of exit holes 242 are in fluid communication with the second fluid source 244 for directing a flow of fluid (e.g., air) from the second fluid source 244 about the second orifice 214 in an omnidirectional flow pattern. The second fluid source 244 may include a variable-speed fan, where such a variable-speed fan may be controlled according to at least one of a horizontal speed of the extruder 200 during extrusion, a type of build material extruded from the extruder 200, or a state of a three-dimensional printer (e.g., a state including but not limited to paused, heating, extruding, moving, and so on).

The flow of fluid from the first fluid source 230 and the second fluid source 244 may be controlled independently and, more generally, may be controlled according to any one or more of various different techniques. For example, one or more of the first fluid source 230 or the second fluid source 244 may itself be controllable—e.g., by turning the respective fluid source on/off for binary control, and/or by ramping up or down the respective fluid source to increase or decrease fluid flow. Further, or instead, the flow of fluid via one or more of the first fluid source 230 or the second fluid source 244 may be controlled through the use of one or more of a valve, a louver, a diffuser, a vent, and so on. For example, in certain implementations, the manifold 240 may be controllable or adjustable to control fluid flow therethrough. For example, one or more of the exit holes 242 may be adjustable (e.g., between a fully open position, a fully closed position, or one or more positions therebetween), and/or an orientation of one or more of the exit holes 242 may be adjustable for controlling a direction of a fluid flow. The temperature of the fluid, the type of fluid, or another attribute of the fluid may also or instead be controllable or otherwise adjustable for one or more of the first fluid source 230 or the second fluid source 244.

A flow of fluid in the extruder 200 may be controlled in response to information obtained by one or more instances of the sensor 250. By way of example, a fluid source may be in communication with (directly or indirectly) one or more sensors 250, such as a temperature sensor that measures or senses the temperature of the nozzle assembly 210 (e.g., at or near one or more of the first orifice 212 and the second orifice 214). Such a temperature sensor may also or instead provide a target temperature for a build material that is received from a controller of a three-dimensional printer that includes the extruder 200.

The extruder 200 may further include a removable and replaceable insulating cap 260 for an exterior surface of the nozzle assembly 210 around the second orifice 214. The insulating cap 260 may be formed of an insulating elastomer that provides a thermal barrier between the exterior surface of the nozzle assembly 210 and an ambient environment. In certain aspects, an outside surface of the insulating cap 260 resists adhesion to a build material used in a three-dimensional print.

Figure 3:
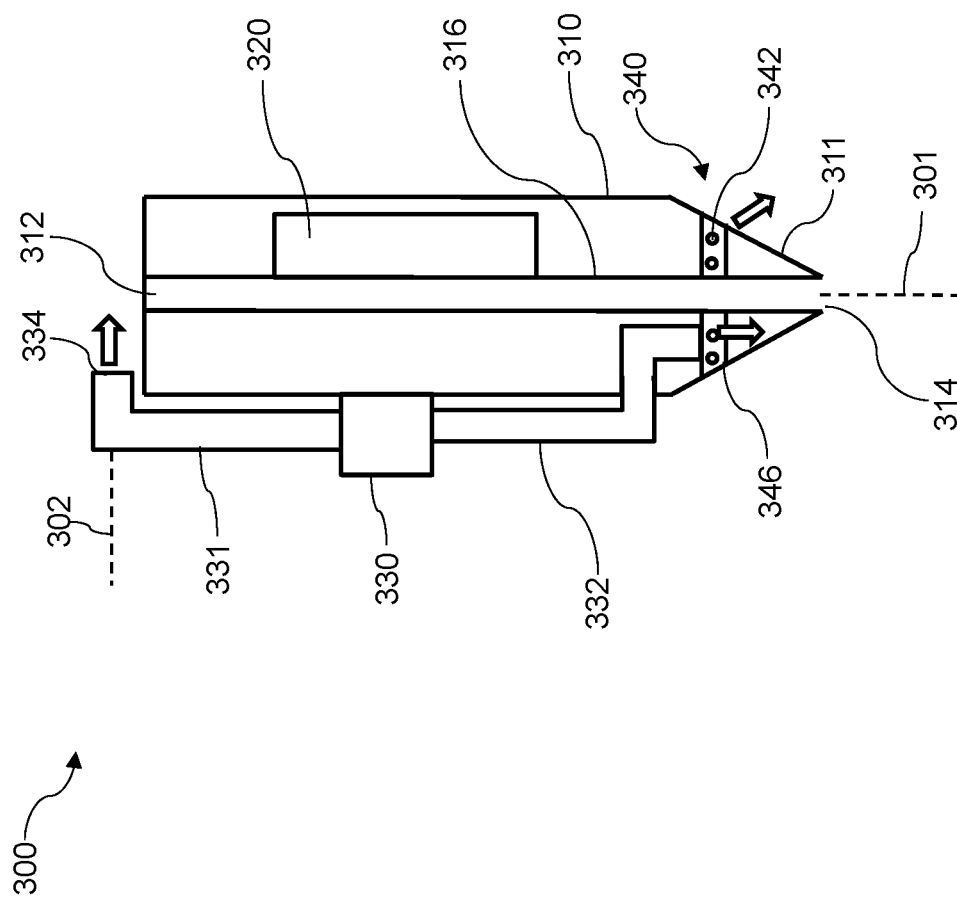
FIG. 3 is a schematic representation of an extruder for a three-dimensional printer.

FIG. 3 is a schematic representation of an extruder for a three-dimensional printer. In general, unless otherwise specified or made clear from the context, the extruder 300 of FIG. 3 may be the same as or similar to the extruder 200 of FIG. 2, but with the extruder 300 of FIG. 3 including only a single fluid source 330. Thus, the extruder 300 of FIG. 3 may similarly include a nozzle assembly 310 and a heating element 320. The nozzle assembly 310 may define a first orifice 312, a second orifice 314, and a chamber 316 extending from the first orifice 312 to the second orifice 314. In certain implementations, the chamber 316 may define a longitudinal axis 301 extending through the first orifice 312 and the second orifice 314. Additionally, or alternatively, the heating element 320 may be in thermal communication with the chamber 316 (e.g., via thermal conduction through the nozzle assembly 310) such that the heating element 320 may heat the chamber 316 to melt a build material for extrusion during a three-dimensional print.

The extruder 300 may include a first conduit 331 and a second conduit 332 for containing and directing a flow of fluid provided from the fluid source 330. For example, the first conduit 331 may be coupled to the nozzle assembly 310. The first conduit 331 may define a third orifice 334 directed toward the first orifice 312 to form a thermal break mitigating heat flow from the chamber 316, via the first orifice 312, to an environment beyond the extruder 300. The third orifice 334 may be aligned, for example, along a transverse axis 302 defined by the first conduit 331. More particularly, the longitudinal axis 301 defined by the chamber 316 of the nozzle assembly 310 may intersect the transverse axis 302 defined by the first conduit 331 at the first orifice 312.

It will be understood that the first conduit 331 and the second conduit 332 may be fluidically isolated from one another. Alternatively, the first conduit 331 and the second conduit 332 may be in fluid communication with one another (e.g., branching off of a Y-connection or similar from the fluid source 330). More generally, it will be understood that numerous configurations are possible for a conduit (or a plurality of conduits) that distribute a fluid from the fluid source 330 (or a plurality of fluid sources) toward the first orifice 312 to form a thermal break and toward the second orifice 314 to actively cool a portion of an environment in the vicinity of the second orifice 314.

Also, or instead, the extruder 300 may include a manifold 340 coupled to the nozzle assembly 310. The manifold 340 may define a plurality of exit holes 342, where each instance of the exit hole 342 of the plurality of exit holes 342 is disposed at a longitudinal position along the longitudinal axis 301 between the first orifice 312 and the second orifice 314. Each instance of the exit hole 342 of the plurality of exit holes 342 may be oriented to direct a fluid in a direction away from the second orifice 314 to cool a region around a perimeter of the second orifice 314 (e.g., to cool build material that was deposited by the extruder 300 in a three-dimensional printing operation). That is, one or more instance of the exit hole 342 of the plurality of exit holes 342 may direct a fluid (e.g., provided from the fluid source 330 via the second conduit 332) in a direction having a radial component away from the second orifice 314 to cool a region around the second orifice 314 while reducing the likelihood of prematurely cooling a build material issuing from the second orifice 314. Further, or instead, the shape of the nozzle assembly 310 may assist in directing or distributing the flow of fluid from the manifold 340. For example, a surface 311 of the nozzle assembly 310 may be tapered between the position of the plurality of exit holes 342 and the second orifice 314. As compared to other shapes, such a taper of the surface 311 may facilitate flowing fluid from the manifold 340 to come into contact with a region of deposited build material with little or no interference from the body of the nozzle assembly 310.

In general, in certain implementations, a first thermal conductivity between the heating element 320 and the chamber 316 may be greater than a second thermal conductivity between the heating element 320 and the plurality of exit holes 342 defined by the manifold 340. That is, as the heating element 320 generates heat, more of the heat generated by the heating element 320 is directed into the build material chamber 316 than into the fluid moving through the plurality of exit holes 342. Such a combination of thermal conductivity may be useful, for example, for delivering a fluid through the plurality of exit holes 342 at a temperature that is relatively cool as compared to the build material heated in the chamber 316 and issued through the second orifice 314.

The manifold 340 may be fluidically isolated from the chamber 316 defined by the nozzle assembly 310. For example, the manifold 340 may be in fluid communication with one or more of the first conduit 331 and the second conduit 332 such that a fluid is deliverable through the plurality of exit holes 342 of the manifold 340 and the third orifice 334 of the conduit via a single fluid source 330. The fluidic isolation between the manifold 340 and the chamber 316 may be useful, for example, for maintaining separate temperatures in each portion of the nozzle assembly 310. Further, or instead, fluidically isolating the manifold 340 and the chamber 316 may reduce the likelihood of prematurely cooling or otherwise promoting a change in the build material in the chamber 316.

The manifold 340 may include an annulus 346 coaxial with the longitudinal axis 301 defined by the chamber 316. The annulus 346 may define the plurality of exit holes 342 of the manifold 340. For example, the exit holes 342 may be spaced equidistant from one another along the annulus 346 to produce an omnidirectional fluid flow pattern about a perimeter of the nozzle assembly 310 to cool a region around the second orifice 314 while directing fluid in a radial direction away from the second orifice 314.

Figure 4:
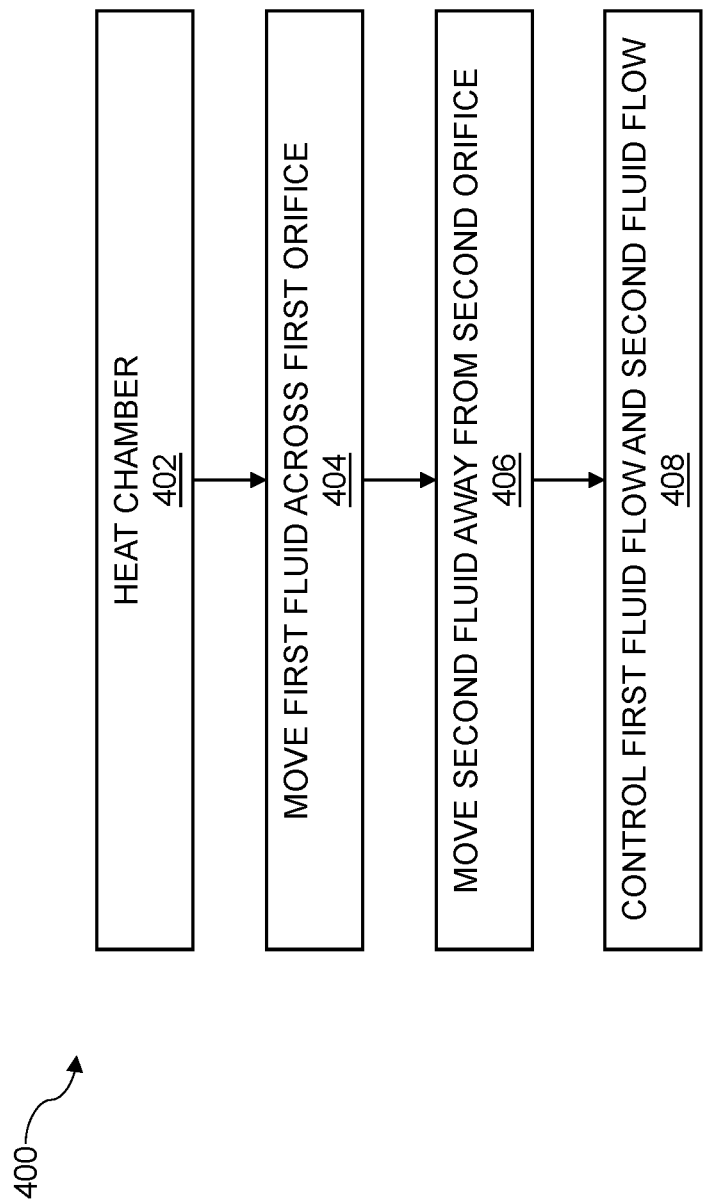
FIG. 4 is a flow chart of a method of thermal management for an extruder of a three-dimensional printer.

FIG. 4 is a flow chart of a method of thermal management for an extruder of a three-dimensional printer. The method 400 may utilize any one or more of the extruders described herein. Thus, unless otherwise specified or made clear from the context, the method 400 may be carried out using the extruder 200 of FIG. 2, the extruder 300 of FIG. 3, or a combination thereof, e.g., operating in the printer 100 of FIG. 1.

As shown in step 402, the method 400 may include heating a chamber defined by a nozzle assembly of the extruder, where the chamber extends from a first orifice (e.g., an inlet for receiving build material within the extruder) to a second orifice (e.g., an outlet for depositing build material from a nozzle of the extruder). Heating the chamber may include maintaining a build material in the chamber at a target temperature above a liquefaction temperature of the build material.

As shown in step 404, the method 400 may include moving a first fluid across the first orifice. This may include blowing or otherwise directing a gas (e.g., air) across the first orifice as a build material is received into the extruder via the first orifice. The first fluid may move across the first orifice at a first temperature below the target temperature of the build material in the chamber. As described above, the target temperature is above a liquefaction temperature of the build material.

As shown in step 406, the method 400 may include moving a second fluid to produce an omnidirectional fluid flow away from the second orifice to cool a region around a perimeter of the second orifice. Moving the second fluid may include directing multiple streams of the second fluid about the perimeter of the second orifice. For example, this may include directing a fluid through discrete exit holes of a manifold such that the fluid moves radially away from a nozzle of the extruder to cool a region around the nozzle while reducing the likelihood of prematurely cooling the build material at the build material issues from the second orifice. The second fluid may move about the perimeter of the second orifice at a second temperature below the target temperature of the build material.

As shown in step 408, the method 400 may include controlling one or more of the flow of the first fluid and the flow of the second fluid. For example, moving the first fluid across the first orifice may include adjusting a volumetric flow rate of the first fluid across the first orifice (e.g., based on a temperature of the nozzle assembly). Further, or instead, moving the second fluid may include adjusting a volumetric flow rate of the second fluid (e.g., based on movement of the extruder). In certain implementations, movement of the first fluid across the first orifice may be independently controllable relative to movement of the second fluid about the perimeter of the second orifice. Alternatively, or in addition, movement of the first fluid across the first orifice may be controllable relative to movement of the second fluid about the perimeter of the second orifice.

Thus, as described herein, an extruder may include one or more cooling components, such as fans. For example, one or more of the extruders in a printer (e.g., each extruder) may include at least two fans—a first fan and a second fan—which may be variable-speed fans. The first fan may be disposed toward an inlet of the extruder to form a thermal break for the extruder. The first fan may operate in response to a thermocouple of the extruder. The second fan may be disposed toward or away from the nozzle of the extruder (e.g., to cool the extrudate and/or to act as an active cooling fan for the printer). The second fan may be controlled based on, for example, part geometry and a build material that is being used in a three-dimensional print. The second fan may blow air out of a carriage duct, which may include a structure that surrounds each nozzle. In this manner, the second fan may be used to achieve fluid movement useful for actively cool a print in a local region. The duct structure may be made of plastic or similar. Further, one or more of the first fan and the second fan may be controlled by a proportional-integral-derivative (PID) controller or similar.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An extruder for a three-dimensional printer, the extruder comprising:
a nozzle assembly defining a first orifice, a second orifice, and a chamber fluidically coupling the first orifice to the second orifice;
a heating element in thermal communication with the chamber and positioned to heat the chamber via thermal conduction through the nozzle assembly;
a first fluid source directed toward the first orifice to form a thermal break mitigating an upward heat flow from the chamber toward the first orifice; and
a manifold structurally configured to draw a flow of ambient air from an ambient environment and to direct the flow of ambient air about the second orifice, the manifold defining a plurality of exit holes for the flow of ambient air, the plurality of exit holes positioned and oriented to direct the flow of ambient air in an omnidirectional fluid flow angled radially away from the second orifice and the nozzle assembly to cool a region of deposited build material around the perimeter of the second orifice rather than a portion of build material moving through the second orifice, wherein a first thermal conductivity between the heating element and the chamber is greater than a second thermal conductivity between the heating element and the plurality of exit holes defined by the manifold.

2. The extruder of claim 1, wherein the flow of ambient air is provided by the first fluid source.

3. The extruder of claim 1, wherein the flow of ambient air is provided by a second fluid source independent from the first fluid source.

4. The extruder of claim 1, wherein exit holes of the plurality of exit holes are spaced equidistant from one another about a perimeter of the nozzle assembly.

5. The extruder of claim 1, wherein the heating element is configured to heat the chamber to maintain a build material in the chamber at a target temperature above a liquefaction temperature of the build material, wherein the first fluid source moves ambient air toward the first orifice at a first temperature below the target temperature of the build material in the chamber, and wherein the flow of ambient air about the second orifice is provided at a second temperature below the target temperature of the build material.

6. An extruder for a three-dimensional printer, the extruder comprising:
a nozzle assembly defining a first orifice, a second orifice, and a chamber extending from the first orifice to the second orifice, the chamber defining a longitudinal axis extending through the first orifice and the second orifice;
a heating element coupled to the nozzle assembly, the heating element in thermal communication with the chamber via thermal conduction through the nozzle assembly;
a conduit coupled to the nozzle assembly, the conduit defining a third orifice directed toward the first orifice to form a thermal break mitigating heat flow from the chamber toward the first orifice; and
a manifold coupled to the nozzle assembly and configured to draw a flow of ambient air from an ambient environment, the manifold defining a plurality of exit holes, each exit hole of the plurality of exit holes disposed at a position along the longitudinal axis between the first orifice and the second orifice, and each exit hole of the plurality of exit holes angled radially away from the second orifice and the nozzle assembly to direct the flow of ambient air to cool a region of deposited build material around a perimeter of the second orifice, wherein a first thermal conductivity between the heating element and the chamber is greater than a second thermal conductivity between the heating element and the plurality of exit holes defined by the manifold.

7. The extruder of claim 6, wherein the manifold is fluidically isolated from the chamber defined by the nozzle assembly.

8. The extruder of claim 7, wherein the manifold is in fluid communication with the conduit such that a fluid is deliverable through the plurality of exit holes of the manifold and the third orifice of the conduit via a single fluid source.

9. The extruder of claim 6, wherein the manifold includes an annulus coaxial with the longitudinal axis defined by the chamber to produce an omnidirectional fluid flow about the second orifice.

10. The extruder of claim 6, wherein the exit holes corresponding to the plurality of exit holes are spaced equidistant from one another about a perimeter of a surface of the nozzle assembly.

11. The extruder of claim 6, wherein the longitudinal axis defined by the chamber of the nozzle assembly intersects a transverse axis defined by the conduit at the first orifice.

12. The extruder of claim 6, wherein, in a direction along the longitudinal axis, a surface of the nozzle assembly is tapered between the position of the plurality of exit holes and the second orifice.

* * * * *